US012674963B2

(12) United States Patent
Kim et al.

(10) Patent No.: US 12,674,963 B2
(45) Date of Patent: Jul. 7, 2026

(54) IMAGING LENS SYSTEM

(71) Applicant: SAMSUNG ELECTRO-MECHANICS CO., LTD., Suwon-si (KR)

(72) Inventors: Hyuk Joo Kim, Suwon-si (KR); Kyu Min Chae, Suwon-si (KR); Hwan Soo Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 797 days.

(21) Appl. No.: 17/689,118

(22) Filed: Mar. 8, 2022

(65) Prior Publication Data

US 2023/0059118 A1    Feb. 23, 2023

(30) Foreign Application Priority Data

Aug. 5, 2021    (KR) ........................ 10-2021-0103230

(51) Int. Cl.
*G02B 13/00*        (2006.01)
*G02B 9/64*        (2006.01)

(52) U.S. Cl.
CPC ........... *G02B 13/0045* (2013.01); *G02B 9/64* (2013.01)

(58) Field of Classification Search
CPC .... G02B 13/0045; G02B 9/64; G02B 3/0087; G02B 13/18; G02B 2003/0093
USPC ........................................................ 359/755
See application file for complete search history.

(56) References Cited

U.S. PATENT DOCUMENTS

| | | | |
|---|---|---|---|
| 10,571,661 B2 * | 2/2020 | Huang ..................... | G02B 3/02 |
| 11,650,397 B2 | 5/2023 | Chae et al. | |
| 2016/0223790 A1 | 8/2016 | Liao et al. | |
| 2018/0031807 A1 | 2/2018 | Chen et al. | |
| 2018/0056869 A1 | 3/2018 | Nagano | |
| 2018/0307000 A1 | 10/2018 | Lai et al. | |
| 2019/0094495 A1 | 3/2019 | Amano et al. | |
| 2019/0154974 A1 | 5/2019 | Chen | |
| 2019/0187442 A1 | 6/2019 | Jia et al. | |
| 2019/0204555 A1 | 7/2019 | Jhang et al. | |
| 2019/0346663 A1 | 11/2019 | Tang et al. | |
| 2020/0081231 A1 | 3/2020 | Komiyama | |
| 2020/0150386 A1 | 5/2020 | Wei et al. | |

(Continued)

FOREIGN PATENT DOCUMENTS

| | | |
|---|---|---|
| CN | 107065141 A | 8/2017 |
| CN | 108919459 A | 11/2018 |

(Continued)

OTHER PUBLICATIONS https://lightmachinery.com/media/1552/schott_tie-19_temperature_coefficient_of_refractive_index.pdf "TIE-19: Temperature Coefficient of the Refractive Index" by Schott (Year: 2008).*

(Continued)

*Primary Examiner* — Collin X Beatty
(74) *Attorney, Agent, or Firm* — NSIP Law

(57) ABSTRACT

An imaging lens system includes: a first lens, a second lens, a third lens, a fourth lens, a fifth lens, a sixth lens, and a seventh lens, sequentially disposed from an object side. The third lens has a refractive index temperature coefficient of 2.2 to 3.5 [$10^{-6}$/° C.], and 0<f34*0.8<f, where f is a focal length of the imaging lens system and f34 is a composite focal length of the third lens and the fourth lens.

9 Claims, 5 Drawing Sheets

(56) References Cited

U.S. PATENT DOCUMENTS

| | | | |
|---|---|---|---|
| 2020/0206555 A1 | 7/2020 | Yacoboski | |
| 2020/0301110 A1 | 9/2020 | Hsu et al. | |
| 2020/0363609 A1 | 11/2020 | Bao et al. | |
| 2021/0048625 A1 | 2/2021 | Yang et al. | |
| 2021/0048636 A1 | 2/2021 | Chen | |
| 2021/0072509 A1 | 3/2021 | Chae et al. | |
| 2021/0157092 A1 | 5/2021 | Chen et al. | |
| 2021/0173182 A1 | 6/2021 | Dai et al. | |
| 2021/0181463 A1* | 6/2021 | Kim | G02B 13/06 |
| 2021/0239945 A1* | 8/2021 | Chang | G02B 9/64 |
| 2021/0356713 A1* | 11/2021 | Jia | G02B 13/0045 |
| 2022/0317420 A1 | 10/2022 | Chae et al. | |
| 2023/0023225 A1 | 1/2023 | Chang et al. | |

FOREIGN PATENT DOCUMENTS

| | | | | | |
|---|---|---|---|---|---|
| CN | 111025568 A | | 4/2020 | | |
| CN | 112014948 A | | 12/2020 | | |
| CN | 112068291 A | | 12/2020 | | |
| CN | 112558270 A | | 3/2021 | | |
| CN | 112711127 A | | 4/2021 | | |
| CN | 112859289 A | | 5/2021 | | |
| CN | 112882207 A | * | 6/2021 | ......... | G02B 13/0015 |
| CN | 112904527 A | | 6/2021 | | |
| CN | 112987244 A | * | 6/2021 | | |
| CN | 113031229 A | | 6/2021 | | |
| JP | 2012-141464 A | | 7/2012 | | |
| JP | 2019-60972 A | | 4/2019 | | |
| JP | 2021-33298 A | | 3/2021 | | |
| KR | 10-2018-0070870 A | | 6/2018 | | |
| KR | 10-2021-0030007 A | | 3/2021 | | |
| KR | 10-2022-0134297 A | | 10/2022 | | |
| TW | 201627713 A | | 8/2016 | | |
| TW | 201804209 A | | 2/2018 | | |
| TW | M575119 U | | 3/2019 | | |
| TW | 201925843 A | | 7/2019 | | |
| TW | 201947274 A | | 12/2019 | | |
| TW | I679443 B | | 12/2019 | | |
| TW | I690743 B | | 4/2020 | | |
| TW | 202040206 A | | 11/2020 | | |
| TW | I714368 B | | 12/2020 | | |
| TW | I726835 B | | 5/2021 | | |
| TW | 202122853 A | | 6/2021 | | |
| TW | 202303214 A | | 1/2023 | | |
| WO | WO 2018/110526 A1 | | 6/2018 | | |

OTHER PUBLICATIONS

Schott TIE-19 temperature coefficient of refractive index (Year: 2009).*

Herbert Gross. Handbook of Optical Systems: vol. 3 Aberration Theory and Correction of Optical Systems. Copyright © 2007 WILEY-VCH Verlag GmbH & Co. KGaA, Weinheim. (Year: 2006).*

Taiwanese Office Action issued on Jul. 8, 2022, in counterpart Taiwanese Patent Application No. 111109257 (5 Pages in English, 6 Pages in Mandarin).

Chinese Office Action issued on Jan. 13, 2024, in counterpart Chinese Patent Application No. 202210563608.X (4 pages in English, 7 pages in Chinese).

Grey, David S., "Athermalization of Optical Systems", Journal of the Optical Society of America 38.6 (1948): 542-546.

Taiwanese Office Action issued on Oct. 31, 2023, in counterpart Taiwanese Patent Application No. 112103701 (4 pages in English, 5 pages in Chinese).

Korean Office Action issued on Jan. 18, 2024, in counterpart Korean Patent Application No. 10-2021-0103230 (5 pages in English, 4 pages in Korean).

Taiwanese Office Action Issued on May 9, 2024, in Counterpart Taiwanese Patent Application No. 113113995 (9 Pages in English, 10 Pages in Chinese).

Taiwanese Office Action issued on Nov. 6, 2024, in counterpart Taiwanese Patent Application No. 113140577 (13 pages in English, 12 pages in Chinese).

Taiwanese Office Action Issued on Jun. 13, 2025 in counterpart Taiwanese Patent Application No. 114114828 (22 Pages in English, 19 Pages in Chinese).

Schott, A. G. "TIE-19: Temperature coefficient of the refractive index." *Proc. SCHOTT Technical information* (Jul. 2008). pp. 1-12.

Korean Office Action issued on Nov. 26, 2026 in corresponding Korean Patent Application No. 10-2021-0103230. (4 pages in English and 4 pages in Korean).

Korean Office Action Issued on Nov. 26, 2025, in counterpart Korean Patent Application No. 10-2021-0103230 (4 Pages in English, 4 Pages in Korean).

* cited by examiner

IMAGING LENS SYSTEM

CROSS-REFERENCE TO RELATED APPLICATION(S)

This application claims the benefit under 35 USC 119(a) of Korean Patent Application No. 10-2021-0103230, filed on Aug. 5, 2021 with the Korean Intellectual Property Office, the entire disclosure of which is incorporated herein by reference for all purposes.

BACKGROUND

The following description relates to an imaging lens system for realizing constant optical performance, regardless of a change in temperature of a surrounding environment.

Since early small surveillance cameras were configured to image obstacles in a vicinity of the vehicle, such cameras had relatively low resolution, but also had a large range of resolution changes according to temperature change of −40 to 80° C. However, as an autonomous driving function of the vehicle is increasingly required, the development of a surveillance camera having high resolution and which can realize certain optical characteristics, even in severe temperature conditions, is required.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes: a first lens, a second lens, a third lens, a fourth lens, a fifth lens, a sixth lens, and a seventh lens, sequentially disposed from an object side. The third lens has a refractive index temperature coefficient of 2.2 to 3.5 $[10^{-6}/°$ C.], and $0<f34*0.8<f$, where f is a focal length of the imaging lens system and f34 is a composite focal length of the third lens and the fourth lens.

The first lens, the second lens, and the third lens may be formed of a material different from a material of the fourth lens, the fifth lens, the sixth lens, and the seventh lens.

The imaging lens system may satisfy $35<V2/Nd2<45$, where V2 is an Abbe number of the second lens, and Nd2 is a refractive index of the second lens.

The imaging lens system may satisfy $20<V3/Nd3<30$, where V3 is an Abbe number of the third lens, and Nd3 is a refractive index of the third lens.

The imaging lens system may satisfy $10<V5/Nd5<20$, where V5 is an Abbe number of the fifth lens, and Nd5 is a refractive index of the fifth lens.

The imaging lens system may satisfy $30<V6/Nd6<40$, where V6 is an Abbe number of the sixth lens, and Nd6 is a refractive index of the sixth lens.

The imaging lens system may satisfy $27<V$ min $13/Nd$ min $13<37$, where V min 13 is a minimum value among Abbe numbers of the first lens, the second lens, and the third lens, and Nd min 13 is a minimum value among refractive indices of the first lens, the second lens, and the third lens.

The imaging lens system may satisfy $30<V$ max $47/Nd$ max $47<35$, where V max 47 is a maximum value among Abbe numbers of the fourth lens, the fifth lens, the sixth lens, and the seventh lens, and Nd max 47 is a maximum value among refractive indices of the fourth lens, the fifth lens, the sixth lens, and the seventh lens.

The imaging lens system may satisfy $0.4<f/f3<0.9$, where f3 is a focal length of the third lens.

In another general aspect, an imaging lens system includes: a first lens having negative refractive power; a second lens having a concave-object side surface; a third lens having a convex object-side surface; a fourth lens having positive refractive power; a fifth lens having a concave object-side surface; a sixth lens having a convex object-side surface; and a seventh lens having negative refractive power. The imaging lens system satisfies $0<f34*0.8<f$, where f is a focal length of the imaging lens system, and f34 is a composite focal length of the third lens and the fourth lens.

The first lens may have a convex object-side surface.

The first lens may have a refractive index temperature coefficient of 2.5 to 4.5 $[10^{-6}/°$ C.].

The second lens may have a refractive index temperature coefficient of 1.0 to 2.5 $[10^{-6}/°$ C.].

The fourth lens may have a refractive index temperature coefficient of −110 to −80 $[10^{-6}/°$ C.].

The fifth lens may have a concave image-side surface.

The imaging lens system may satisfy $1.1<Nd3/Nd4<1.2$, where Nd3 is a refractive index of the third lens, and Nd4 is a refractive index of the fourth lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
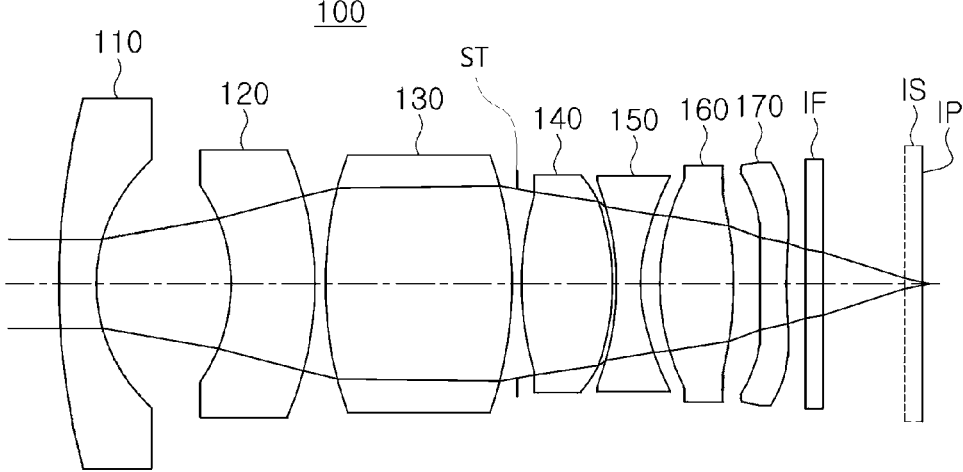
FIG. 1 is a block diagram of an imaging lens system according to a first embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

An optical imaging system includes a plurality of lenses disposed along an optical axis. The plurality of lenses may be spaced apart from each other by predetermined distances along the optical axis.

For example, the optical imaging system includes a first lens, a second lens, a third lens, a fourth lens, a fifth lens, a sixth lens, and a seventh lens sequentially disposed in ascending numerical order along the optical axis from an object side of the optical imaging system toward an imaging plane of the optical imaging system, with the first lens being closest to the object side of the optical imaging system and the lens being closest to the imaging plane.

In each lens, an object-side surface or a first surface is a surface of the lens closest to the object side of the optical imaging system, and an image-side surface or a second surface is a surface of the lens closest to the imaging plane.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle $\theta$ to the optical axis, and the approximations $\sin \theta \approx \theta$, $\tan \theta \approx \theta$, and $\cos \theta \approx 1$ are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as being convex, the entire object-side surface of the lens may not be convex, and a peripheral region of the object-side surface of the lens may be concave. Also, even though the image-side surface of the lens may be described as being concave, the entire image-side surface of the lens may not be concave, and a peripheral region of the image-side surface of the lens may be convex.

At least one of the first to seventh lenses of the optical imaging system may have at least one aspherical surface.

The optical imaging system may further include other elements in addition to the first to seventh lenses.

The optical imaging system may further include at least one stop disposed before the first lens, or between any two adjacent lenses of the first to seventh lenses, or between the seventh lens and the imaging plane. The optical imaging system may include two or more stops disposed at different locations.

The optical imaging system may further include an image sensor having an imaging surface disposed at the imaging plane of the optical imaging system. The image sensor converts an image of an object formed on an effective imaging area of the imaging surface by the lenses of the optical imaging system into an electrical signal.

The optical imaging system may further include an infrared blocking filter, hereinafter referred to as a filter, for blocking infrared light. The filter may be disposed between the seventh lens and the imaging plane.

The optical imaging system may further include at least one reflective member having a reflective surface that changes a direction of an optical path in the optical imaging system. For example, the reflective member may be a prism or a mirror.

For example, the reflective member may be disposed in the optical path on the object-side of the first lens, between any two lenses among the second to seventh lenses, or on the image-side of the seventh lens.

For example, the optical imaging system may further include a first reflective member disposed in an optical path between the object side of the optical imaging system and the object-side surface of the first lens. Therefore, the first lens may be a lens disposed closest to the first reflective member among the first to seventh lenses.

Also, the optical imaging system may further include a second reflective member disposed in an optical path between the image-side surface of the seventh lens and the imaging plane. Therefore, the seventh lens may be a lens disposed closest to the second reflective member among the first to seventh lenses.

TTL is a distance along the optical axis from the object-side surface of the first lens to the imaging plane.

SL is a distance along the optical axis from a stop of the optical imaging system to the imaging plane.

BFL is a distance along the optical axis from the image-side surface of the seventh lens to the imaging plane.

PTTL is a distance along the optical axis from the reflective surface of the first reflective member to the imaging plane.

ImgH is a maximum effective image height of the optical imaging system and is equal to one half of a diagonal length of the effective imaging area of the imaging surface of the image sensor.

f is a focal length of the optical imaging system, and f1, f2, f3, f4, f5, f6, and f7 are respective focal lengths of the first to seventh lenses.

FOV is an angle of view of the optical imaging system.

Fno is an f-number of the optical imaging system, and is equal to the focal length f of the optical imaging system divided by an entrance pupil diameter of the optical imaging system.

An effective aperture radius of a lens surface is a radius of a portion of the lens surface through which light actually passes, and is not necessarily a radius of an outer edge of the lens surface. Stated another way, an effective aperture radius of a lens surface is a distance in a direction perpendicular to an optical axis of the lens surface between the optical axis and a marginal ray of light passing through the lens surface. The object-side surface of a lens and the image-side surface of the lens may have different effective aperture radiuses.

Radiuses of curvature of the surfaces of the lenses, thickness of the lenses and the other elements, distances between adjacent ones of the lenses and the other elements, focal lengths of the lenses, the focal length f of the optical imaging system, the respective focal lengths f1, f2, f3, f4, f5, f6, and f7 of the first to seventh lenses, TTL, SL, BFL, PTTL, and ImgH are expressed in millimeters (mm), although other units of measurement may be used. FOV is expressed in degrees. Fno, refractive indexes of the lenses, and Abbe numbers of the lenses are dimensionless quantities.

The thicknesses of the lenses and the other elements, the distances between the adjacent ones of the lenses and the other elements, TTL, SL, BFL, and PTTL are measured along the optical axis of the optical imaging system.

An imaging lens system according to various examples includes a plurality of lenses. For example, the imaging lens system may include a first lens, a second lens, a third lens, a fourth lens, a fifth lens, a sixth lens, and a seventh lens, sequentially arranged from an object side.

The imaging lens system may include a lens having a predetermined refractive index temperature coefficient. For example, the third lens may have a refractive index temperature coefficient of 2.2 to 3.5 $[10^{-6}/^\circ$ C.]. The imaging lens system may be configured to satisfy a predetermined conditional expression. For example, the imaging lens system may satisfy a conditional expression of $0<f34*0.8<f$. In the conditional expression, f is a focal length of the imaging lens system, and f34 is a composite focal length of the third lens and the fourth lens. An imaging lens system according to an example includes a plurality of lenses. For example, the imaging lens system may include a first lens, a second lens, a third lens, a fourth lens, a fifth lens, a sixth lens, and a seventh lens, sequentially disposed from an object side. The imaging lens system may include a lens having predetermined refractive power. For example, the first lens and the seventh lens may have negative refractive power, and the fourth lens may have positive refractive power. In addition, the imaging lens system according to the present embodiment may include a lens having a predetermined shape. For example, an object-side surface of the second lens and an object-side surface of the fifth lens may be concave. As another example, an object-side surface of the third lens and an object-side surface of the sixth lens may be convex. In addition, in the imaging lens system, a conditional expression of $0<f34*0.8<f$ may be satisfied.

The imaging lens system according to an example may be configured as a combination of the imaging lens system according to one example and the imaging lens system according to another example. As an example, the imaging lens system may be configured to include some features of the imaging lens system according to one example and some features of the imaging lens system according to another example.

As an example, the imaging lens system includes first to seventh lenses, sequentially disposed from an object side, and may include a first lens having negative refractive power and a third lens having a refractive index temperature coefficient of 2.2 to 3.5 $[10^{-6}/^\circ$ C.].

As another example, the imaging lens system includes first to seventh lenses, sequentially disposed from an object side, and may include a second lens having a concave object-side surface and a third lens having a refractive index temperature coefficient of 2.2 to 3.5 $[10^{-6}/^\circ$ C.].

The imaging lens system may include one or more lenses having the following characteristics, if necessary. As an example, the imaging lens system may include one or more of the first to seventh lenses according to the following features. As another example, the imaging lens system may include two or more of the first to seventh lenses according to the following features. However, the configuration of the imaging lens system is not limited thereto.

Hereinafter, characteristics of first to seventh lenses will be described.

The first lens has refractive power. One surface of the first lens may be convex. For example, the first lens has a convex object-side surface. The first lens includes a spherical surface or an aspherical surface. For example, both surfaces of the first lens may be spherical. The first lens may be formed of a material having high light transmittance and excellent workability. For example, the first lens may be formed of a glass material. The first lens has a predetermined refractive index. For example, the refractive index of the first lens may be 1.75 or more.

The second lens has refractive power. One surface of the second lens may be convex. For example, the second lens may have a convex image-side surface. The second lens includes a spherical surface. For example, both surfaces of the second lens may be spherical. The second lens may be formed of a material having high light transmittance and excellent workability. For example, the second lens may be formed of a glass material. The second lens has a predetermined refractive index. For example, the refractive index of the second lens may be less than 1.53.

The third lens has refractive power. One surface of the third lens may be convex. For example, the third lens may have a convex image-side surface. The third lens includes a spherical surface. For example, both surfaces of the third lens may be spherical. The third lens may be formed of a material having high light transmittance and excellent workability. For example, the third lens may be formed of a glass material. The third lens has a refractive index greater than that of the first and second lenses. For example, the refractive index of the third lens may be 1.78 or more.

The fourth lens has refractive power. One surface of the fourth lens may be convex. For example, the fourth lens may be a convex object-side surface. The fourth lens includes an aspherical surface. For example, both surfaces of the fourth lens may be aspherical. The fourth lens may be formed of a material having high light transmittance and excellent workability. For example, the fourth lens may be formed of a plastic material. The fourth lens has a predetermined refractive index. For example, the refractive index of the fourth lens may be less than 1.56.

The fifth lens has refractive power. One surface of the fifth lens may be concave. For example, the fifth lens may have a concave image-side surface. The fifth lens includes an aspherical surface. For example, both surfaces of the fifth lens may be aspherical. The fifth lens may be formed of a material having high light transmittance and excellent workability. For example, the fifth lens may be formed of a plastic material. The fifth lens has a predetermined refractive index. For example, the refractive index of the fifth lens may be 1.6 or more.

The sixth lens has refractive power. One surface of the sixth lens may be convex. For example, the sixth lens may have a convex image-side surface. The sixth lens includes an aspherical surface. For example, both surfaces of the sixth lens may be aspherical. The sixth lens may be formed of a material having high light transmittance and excellent workability. For example, the sixth lens may be formed of a plastic material. The sixth lens has a refractive index, substantially similar to that of the fourth lens. For example, the refractive index of the sixth lens may be less than 1.56.

The seventh lens has refractive power. One surface of the seventh lens may be concave. For example, the seventh lens may have a concave image-side surface. The seventh lens includes an aspherical surface. For example, both surfaces of the seventh lens may be aspherical. The seventh lens may be formed of a material having high light transmittance and excellent workability. For example, the seventh lens may be formed of a plastic material. The seventh lens has a refractive index, substantially similar to that of the sixth lens. For example, the refractive index of the seventh lens may be less than 1.56.

The aspherical lens constituting the imaging lens system may be expressed by Equation 1 below.

$$Z = \frac{cr^2}{1 + \sqrt{1 - (1 + k)c^2 r^2}} + Ar^4 + \qquad \text{Equation 1}$$
$$Br^6 + Cr^8 + Dr^{10} + Er^{12} + Fr^{14} + Fr^{14} + Gr^{16} + \ldots$$

In Equation 1, c is a reciprocal of a radius of curvature of the lens, k is a conical constant, r is a distance from any point on an aspherical surface to an optical axis, A, B, C, D, E, F, F, G are aspherical surface constants, and Z (or SAG) is a height in an optical axis direction from any point on an aspherical surface to an apex of the aspherical surface.

The imaging lens system may include lenses of different materials. For example, the first to third lenses may be formed of a material, different from that of the fourth to seventh lenses. As a specific example, the first to third lenses may be formed of a glass material having a small coefficient of thermal expansion due to external impact and temperature change, and the fourth lens and the seventh lens may be formed of a plastic material that is easy to process.

The imaging lens system may include a lens having a predetermined refractive index temperature coefficient. As an example, the imaging lens system may include a first lens having a refractive index temperature coefficient of 2.5 to 4.5 [$10^{-6}/^\circ$ C.]. As another example, the imaging lens system may include a second lens having a refractive index temperature coefficient of 1.0 to 2.5 [$10^{-6}/^\circ$ C.]. As another example, the imaging lens system may include a fourth lens having a refractive index temperature coefficient of −110 to −80 [$10^{-6}/^\circ$ C.].

The imaging lens system includes a stop, an imaging plane, and a filter. In addition, the imaging lens system may further include cover glass.

As an example, the stop may be disposed between the third lens and the fourth lens. As another example, the stop may be disposed on an image-side of the lens having positive refractive power, or may be disposed between a lens having positive refractive power and a lens having positive refractive power. The imaging plane may be formed at a point at which light refracted by the first to seventh lenses is formed. The imaging plane may be formed by an image sensor. For example, the imaging plane may be formed on a surface of the image sensor or inside the image sensor. A filter may be disposed between the seventh lens and the imaging plane. The filter may block light of some wavelengths. For example, the filter may block light of infrared wavelengths. The cover glass may be disposed between the filter and the imaging plane.

The imaging lens system may satisfy one or more of the following conditional expressions:

$$20 < V1/Nd1 < 30$$

$$35 < V2/Nd2 < 45$$

$$20 < V3/Nd3 < 30$$

$$30 < V4/Nd4 < 40$$

$$10 < V5/Nd5 < 20$$

$$30<V6/Nd6<40$$

$$30<V7/Nd7<40$$

$$2721 \ V \min 13/Nd \min 13<37$$

$$30<V \max 47/Nd \max 47<35$$

$$0.4<f/f3<0.9$$

$$1.1<Nd3/Nd4<1.2$$

wherein the conditional expressions, V1 is an Abbe number of the first lens, Nd1 is a refractive index of the first lens, V2 is an Abbe number of the second lens, Nd2 is a refractive index of the second lens, V3 is an Abbe number of the third lens, Nd3 is a refractive index of the third lens, V4 is an Abbe number of the fourth lens, Nd4 is a refractive index of the fourth lens, V5 is an Abbe number of the fifth lens, Nd5 is a refractive index of the fifth lens, and V6 is an Abbe number of the sixth lens, Nd6 is a refractive index of the sixth lens, V7 is an Abbe number of the seventh lens, Nd7 is a refractive index of the first lens, and V min 13 is a minimum value among the Abbe numbers of the first to third lenses, Nd min 13 is a minimum value among the refractive indices of the first to third lenses, V max 47 is a maximum value among the Abbe numbers of the fourth to seventh lenses, and Nd max 47 is a maximum value among the refractive indices of the fourth to seventh lenses, f is a focal length of the imaging lens system, and f3 is a focal length of the third lens.

Hereinafter, various examples will be described in detail based on the accompanying illustrative drawings.

First, an imaging lens system according to a first example will be described with reference to FIG. 1.

An imaging lens system 100 includes a first lens 110, a second lens 120, a third lens 130, a fourth lens 140, a fifth lens 150, a sixth lens 160, and a seventh lens 170.

The first lens 110 has negative refractive power, and has a convex object-side surface and a concave image-side surface. The second lens 120 has negative refractive power, and has a concave object-side surface and a convex image-side surface. The third lens 130 has positive refractive power, and has a convex object-side surface and a convex image-side surface. The fourth lens 140 has positive refractive power, and has a convex object-side surface and a convex image-side surface. The fifth lens 150 has negative refractive power, and has a concave object-side surface and a concave image-side surface. The sixth lens 160 has positive refractive power, and has a convex object-side surface and a convex image-side surface. The seventh lens 170 has negative refractive power, and has a convex object-side surface and a concave image-side surface.

The imaging lens system 100 may further include a stop ST, a filter IF, and an imaging plane IP. The stop ST may be disposed between the third lens 130 and the fourth lens 140. The imaging plane IP may be formed in an image sensor IS, and the filter IF may be disposed between the seventh lens 170 and the imaging plane IP. In addition, cover glass may be integrally formed with the image sensor IS.

Figure 2:
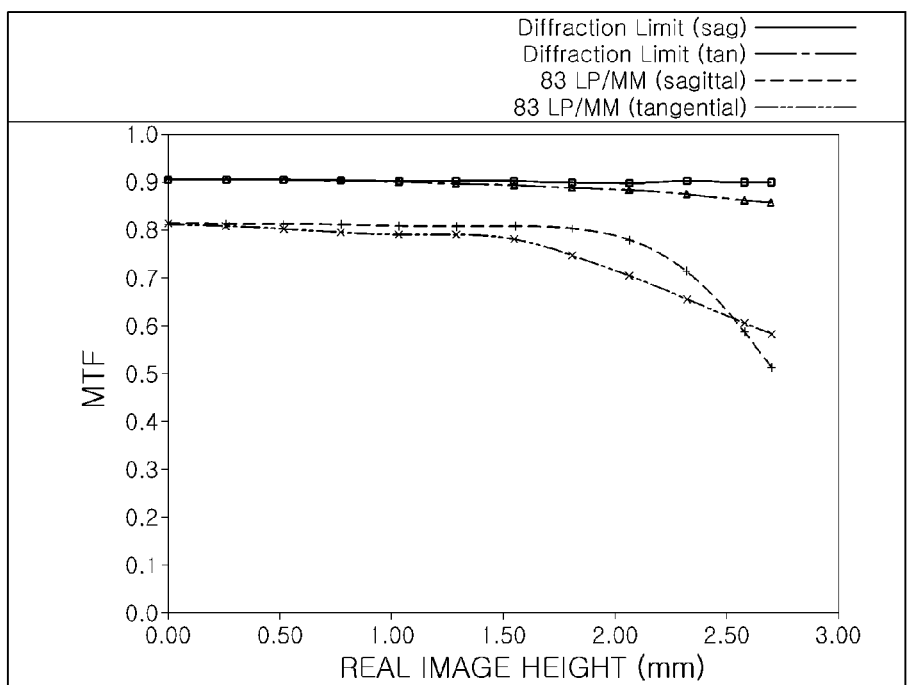
FIG. 2 is a MTF curve of the imaging lens system illustrated in FIG. 1.
Figure 3:
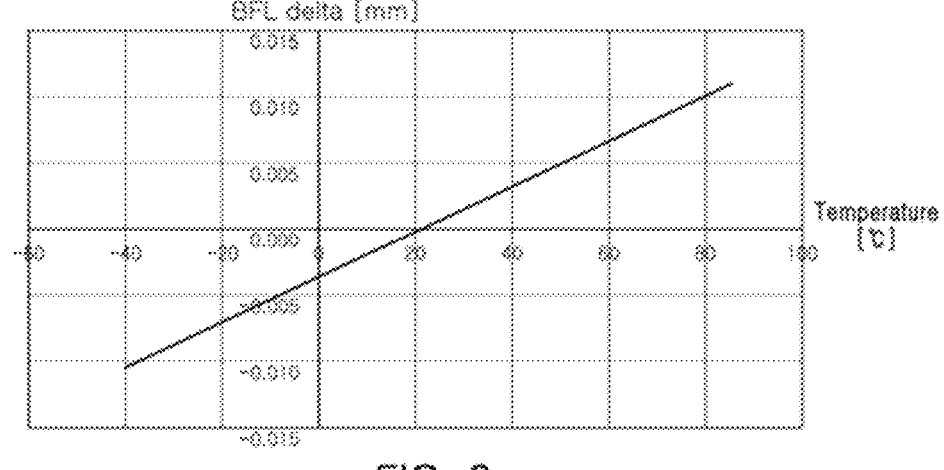
FIG. 3 is a curve illustrating a back focal length (BFL) according to a temperature change of the imaging lens system illustrated in FIG. 1.

FIGS. 2 and 3 illustrate MTF characteristics of the imaging lens system 100 and an amount of change in a back focal length (ΔBFL: μm) according to temperature.

Tables 1 and 2 illustrate lens characteristics and aspheric values of the imaging lens system 100.

TABLE 1

| Surface No. | Reference | Radius of curvature | Thickness/ Distance | Refractive index | Abbe number | DTn $(10^{-6}/°$ C. |
|---|---|---|---|---|---|---|
| S1 | First lens | 16.572 | 0.805 | 1.773 | 49.62 | 3.6 |
| S2 | | 3.657 | 2.965 | | | |
| S3 | Second lens | −3.738 | 1.846 | 1.517 | 64.17 | 1.6 |
| S4 | | −7.191 | 0.200 | | | |
| S5 | Third lens | 8.541 | 4.093 | 1.804 | 46.5 | 2.8 |
| S6 | | −8.541 | 0.100 | | | |
| S7 | | Infinity | 0.100 | | | |
| S8 | Fourth lens | 5.711 | 2.000 | 1.5365 | 55.91 | −95 |
| S9 | | −4.637 | 0.080 | | | |
| S10 | Fifth lens | −6.404 | 0.519 | 1.6397 | 23.53 | −112 |
| S11 | | 3.315 | 0.431 | | | |
| S12 | Sixth lens | 7.402 | 1.618 | 1.5365 | 55.91 | −95 |
| S13 | | −5.067 | 0.543 | | | |
| S14 | Seventh lens | 11.466 | 0.600 | 1.5365 | 55.91 | −95 |
| S15 | | 7.272 | 0.390 | | | |
| S16 | Filter | Infinity | 0.400 | 1.517 | 64.17 | |
| S17 | | Infinity | 1.800 | | | |
| S18 | Cover glass | Infinity | 0.400 | 1.517 | 64.17 | |
| S19 | | Infinity | 0.110 | | | |
| S20 | Imaging plane | Infinity | | | | |

TABLE 2

| Surface No. | K | A | B | C | D |
|---|---|---|---|---|---|
| S8 | 7.0642.E−02 | −2.4369.E−03 | −4.6737.E−04 | −1.1169.E−05 | −2.0495.E−05 |
| S9 | −7.5150.E+00 | 1.1083.E−02 | −7.2883.E−03 | 1.1135.E−03 | −6.7702.E−05 |
| S10 | −2.0400.E+01 | −1.4445.E−02 | 2.2319.E−03 | −5.9120.E−05 | −5.2918.E−06 |
| S11 | 8.3447.E−01 | −2.2231.E−02 | −3.4868.E−04 | 1.0260.E−03 | −1.7444.E−04 |
| S12 | 2.6520.E+00 | 2.0724.E−02 | −8.9739.E−03 | 1.8565.E−03 | −1.4093.E−04 |
| S13 | 2.7857.E+00 | 1.6853.E−02 | −1.2500.E−03 | −4.0621.E−05 | 4.9122.E−05 |
| S14 | 1.8210.E+01 | −2.6214.E−02 | 1.0575.E−03 | −2.8050.E−04 | 3.7860.E−05 |
| S15 | −2.6076.E+01 | −2.0768.E−02 | 1.7587.E−03 | −1.6205.E−04 | 9.8983.E−06 |

Figure 4:
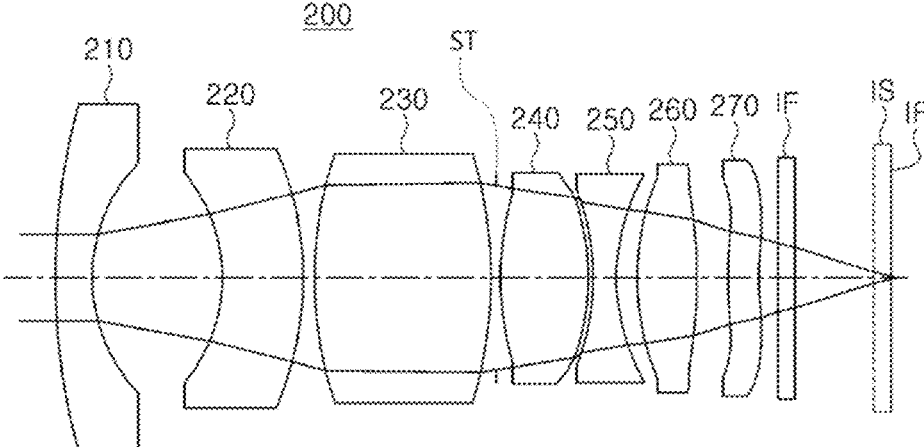
FIG. 4 is a block diagram of an imaging lens system according to a second embodiment of the present disclosure.

An imaging lens system according to a second example will be described with reference to FIG. 4.

An imaging lens system 200 includes a first lens 210, a second lens 220, a third lens 230, a fourth lens 240, a fifth lens 250, a sixth lens 260, and a seventh lens 270.

The first lens 210 has negative refractive power, and has a convex object-side surface and a concave image-side surface. The second lens 220 has negative refractive power, and has a concave object-side surface and a convex image-side surface. The third lens 230 has positive refractive power, and has a convex object-side surface and a convex image-side surface. The fourth lens 240 has positive refractive power, and has a convex object-side surface and a convex image-side surface. The fifth lens 250 has negative refractive power, and has a concave object-side surface and a concave image-side surface. The sixth lens 260 has positive refractive power, and has a convex object-side surface and a convex image-side surface. The seventh lens 270 has negative refractive power, and has a convex object-side surface and a concave image-side surface.

The imaging lens system 200 may further include a stop ST, a filter IF, and an imaging plane IP. The stop ST may be disposed between the third lens 230 and the fourth lens 240. The imaging plane IP may be formed in an image sensor IS, and the filter IF may be disposed between the seventh lens 270 and the imaging plane IP. In addition, cover glass may be integrally formed with the image sensor IS.

Figure 5:
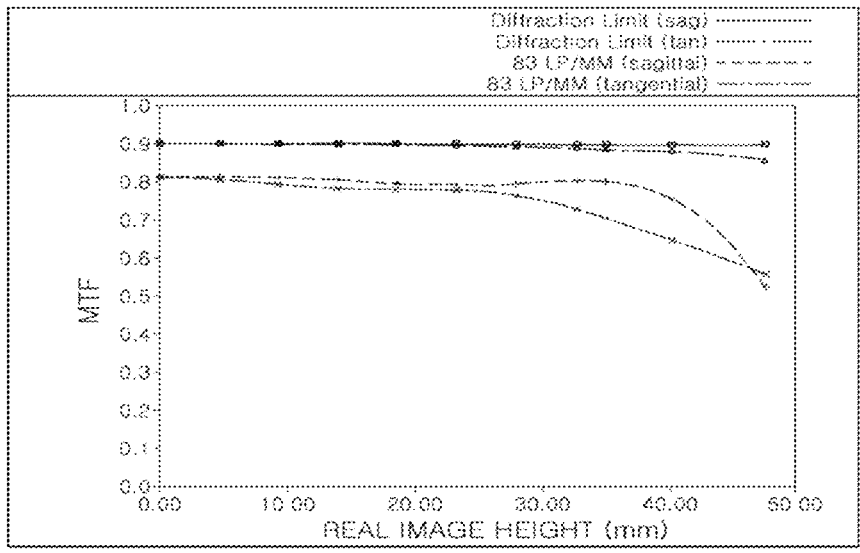
FIG. 5 is an MTF curve of the imaging lens system illustrated in FIG. 4.
Figure 6:
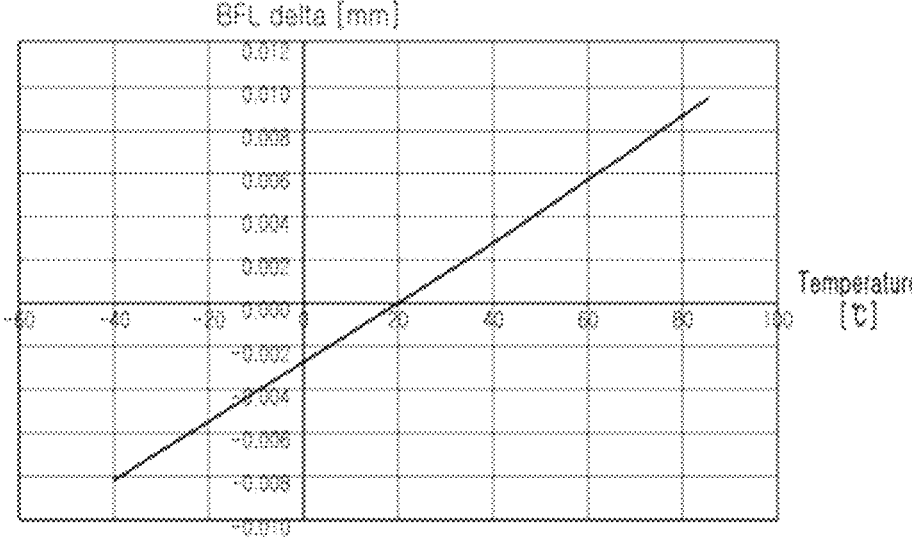
FIG. 6 is a curve illustrating a BFL according to a temperature change of the imaging lens system illustrated in FIG. 4.

FIGS. 5 and 6 illustrate MTF characteristics of the imaging lens system 200 and an amount of change in a back focal length (ΔBFL: μm) according to temperature.

Tables 3 and 4 illustrate lens characteristics and aspheric values of the imaging lens system 200.

TABLE 3

| Surface No. | Reference | Radius of curvature | Thickness distance | Refractive index | Abbe number | DTn (10⁻⁶/° C.) |
|---|---|---|---|---|---|---|
| S1 | First lens | 16.597 | 0.821 | 1.773 | 49.62 | 3.6 |
| S2 | | 3.692 | 2.973 | | | |
| S3 | Second lens | −3.638 | 1.860 | 1.517 | 64.17 | 1.6 |
| S4 | | −7.402 | 0.200 | | | |
| S5 | Third lens | 8.611 | 3.996 | 1.804 | 46.5 | 2.8 |
| S6 | | −8.611 | 0.100 | | | |
| S7 | | Infinity | 0.100 | | | |
| S8 | Fourth lens | 5.822 | 2.000 | 1.5365 | 55.91 | −95 |
| S9 | | −3.793 | 0.080 | | | |
| S10 | Fifth lens | −6.603 | 0.522 | 1.6397 | 23.53 | −112 |
| S11 | | 3.205 | 0.481 | | | |
| S12 | Sixth lens | 13.195 | 1.380 | 1.5365 | 55.91 | −95 |
| S13 | | −5.208 | 0.692 | | | |
| S14 | Seventh lens | 12.366 | 0.684 | 1.5365 | 55.91 | −95 |
| S15 | | 10.894 | 0.384 | | | |
| S16 | Filter | Infinity | 0.400 | 1.517 | 64.17 | |
| S17 | | Infinity | 1.800 | | | |
| S18 | Cover glass | Infinity | 0.400 | 1.517 | 64.17 | |
| S19 | | Infinity | 0.116 | | | |
| S20 | Imaging plane | Infinity | | | | |

TABLE 4

| Surface No. | K | A | B | C | D |
|---|---|---|---|---|---|
| S8 | 6.1743.E−02 | −2.4007.E−03 | −2.9765.E−04 | −2.4390.E−05 | −1.9528.E−05 |
| S9 | −9.8752.E+00 | 1.1954.E−02 | −7.3793.E−03 | 1.1236.E−03 | −7.0377.E−05 |
| S10 | −3.3385.E+01 | −1.2211.E−02 | −2.6904.E−04 | 5.8774.E−04 | −6.0860.E−05 |
| S11 | 5.5242.E−01 | −1.8889.E−02 | −2.9707.E−03 | 1.5675.E−03 | −1.9462.E−04 |
| S12 | 2.3570.E+01 | 3.2261.E−02 | −1.2069.E−02 | 2.2846.E−03 | −1.6979.E−04 |

TABLE 4-continued

| Surface No. | K | A | B | C | D |
|---|---|---|---|---|---|
| S13 | 2.7339.E+00 | 2.2043.E−02 | −3.3001.E−03 | 5.6630.E−04 | −2.6083.E−05 |
| S14 | 1.3661.E+01 | −9.6564.E−03 | −2.4299.E−03 | 5.9171.E−04 | −5.3941.E−05 |
| S15 | 1.3526.E+01 | −1.4778.E−02 | 1.2140.E−04 | 1.2956.E−04 | −1.9478.E−05 |

Figure 7:
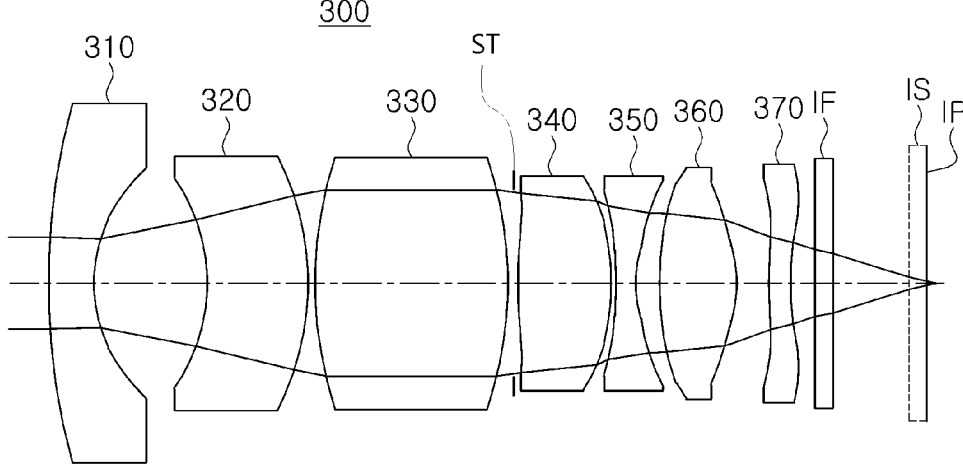
FIG. 7 is a block diagram of an imaging lens system according to a third embodiment of the present disclosure.

An imaging lens system according to a third example will be described with reference to FIG. 7.

An imaging lens system 300 includes a first lens 310, a second lens 320, a third lens 330, a fourth lens 340, a fifth lens 350, a sixth lens 360, and a seventh lens 370.

The first lens 310 has negative refractive power, and has a convex object-side surface and a concave image-side surface. The second lens 320 has negative refractive power, and has a concave object-side surface and a convex image-side surface. The third lens 330 has positive refractive power, and has a convex object-side surface and a convex image-side surface. The fourth lens 340 has positive refractive power, and has a convex object-side surface and a convex image-side surface. The fifth lens 350 has negative refractive power, and has a concave object-side surface and a concave image-side surface. The sixth lens 360 has positive refractive power, and has a convex object-side surface and a convex image-side surface. The seventh lens 370 has negative refractive power, and has a convex object-side surface and a concave image-side surface.

The imaging lens system 300 may further include a stop ST, a filter IF, and an imaging plane IP. The stop ST may be disposed between the third lens 330 and the fourth lens 340. The imaging plane IP may be formed in an image sensor IS, and the filter IF may be disposed between the seventh lens 370 and the imaging plane IP. In addition, cover glass may be integrally formed with the image sensor IS.

Figure 8:
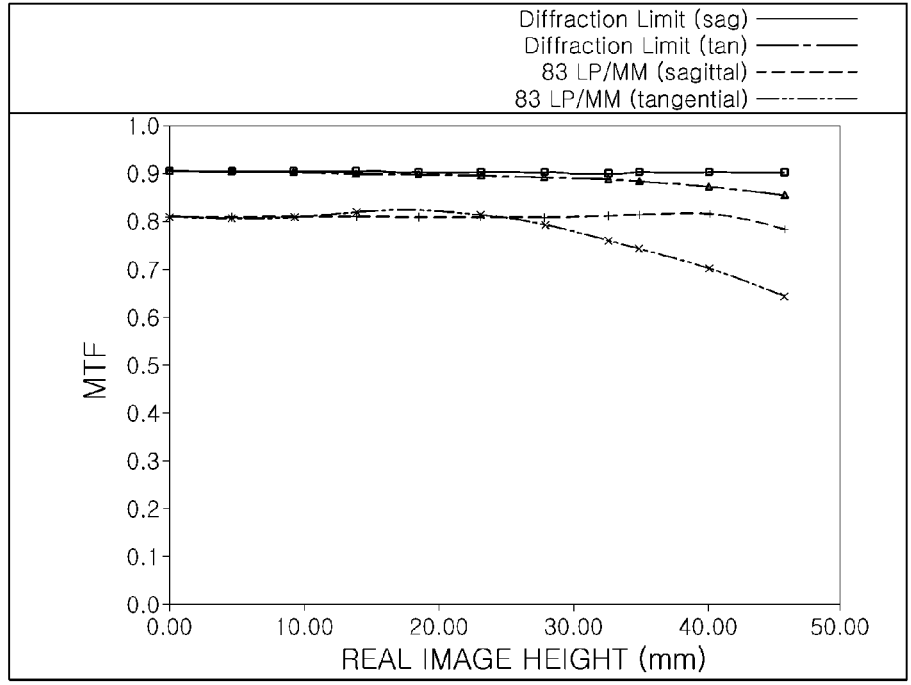
FIG. 8 is an MTF curve of the imaging lens system illustrated in FIG. 7.
Figure 9:
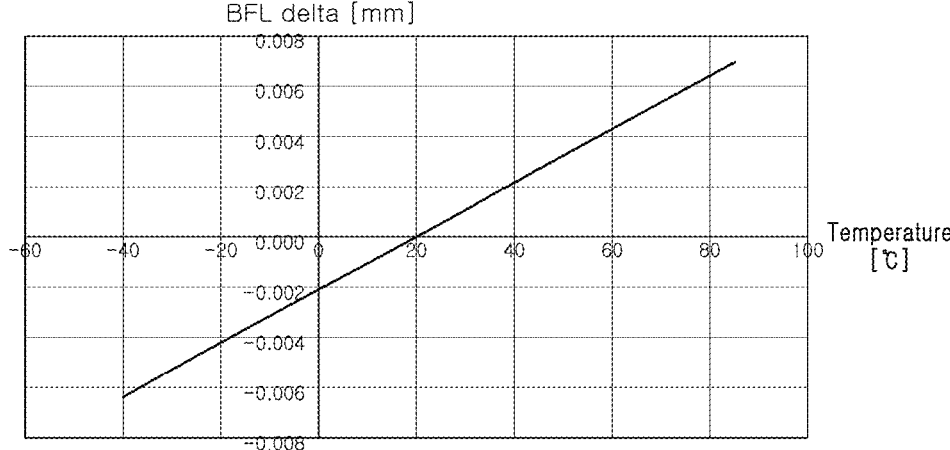
FIG. 9 is a curve illustrating a BTF according to a temperature change of the imaging lens system illustrated in FIG. 7.

FIGS. 8 and 9 illustrate MTF characteristics of the imaging lens system 300 and an amount of change in a back focal length (ΔBFL: μm) according to temperature.

Tables 5 and 6 illustrate lens characteristics and aspheric values of the imaging lens system 300.

TABLE 5

| Surface No. | Reference | Radius of curvature | Thickness distance | Refractive index | Abbe number | DTn ($10^{-6}$/° C. |
|---|---|---|---|---|---|---|
| S1 | First lens | 14.500 | 0.956 | 1.773 | 49.62 | 3.6 |
| S2 | | 3.278 | 2.456 | | | |
| S3 | Second lens | −3.996 | 2.155 | 1.517 | 64.17 | 1.6 |
| S4 | | −5.979 | 0.130 | | | |
| S5 | Third lens | 8.604 | 4.159 | 1.804 | 46.5 | 2.8 |
| S6 | | −8.604 | 0.100 | | | |
| S7 | | Infinity | 0.100 | | | |
| S8 | Fourth lens | 10.832 | 2.000 | 1.5365 | 55.91 | −95 |
| S9 | | −5.501 | 0.082 | | | |
| S10 | Fifth lens | −20.499 | 0.438 | 1.6397 | 23.53 | −112 |
| S11 | | 3.101 | 0.491 | | | |
| S12 | Sixth lens | 8.867 | 1.647 | 1.5365 | 55.91 | −95 |
| S13 | | −3.358 | 0.691 | | | |
| S14 | Seventh lens | 11.478 | 0.496 | 1.6398 | 23 | −95 |
| S15 | | 5.107 | 0.500 | | | |
| S16 | Filter | Infinity | 0.400 | 1.517 | 64.17 | |
| S17 | | Infinity | 1.600 | | | |
| S18 | Cover glass | Infinity | 0.400 | 1.517 | 64.17 | |
| S19 | | Infinity | 0.200 | | | |
| S20 | Imaging plane | Infinity | | | | |

TABLE 6

| Surface No. | K | A | B | C | D |
|---|---|---|---|---|---|
| S8 | −4.7672.E+01 | −1.8479.E−04 | −1.2522.E−03 | 5.7369.E−05 | −9.2322.E−06 |
| S9 | −1.1896.E+01 | −6.2097.E−03 | −1.7162.E−03 | 3.8513.E−04 | −3.3577.E−05 |
| S10 | 7.6939.E+01 | −2.4136.E−02 | 7.2951.E−03 | −9.5074.E−04 | 5.0715.E−05 |
| S11 | −4.2089.E−01 | −2.8224.E−02 | 4.9170.E−03 | −1.4101.E−04 | −3.8423.E−05 |
| S12 | 1.0819.E+01 | 1.4042.E−02 | −7.2970.E−03 | 1.4972.E−03 | −1.0629.E−04 |
| S13 | −8.4400.E+00 | −5.7902.E−04 | −1.0970.E−03 | 9.4651.E−05 | 1.8619.E−05 |
| S14 | 5.5617.E+00 | 5.3117.E−04 | −8.0796.E−03 | 1.6457.E−03 | −1.1181.E−04 |
| S15 | 2.1566.E+00 | −1.6959.E−02 | −2.7458.E−03 | 7.7632.E−04 | −6.0830.E−05 |

Table 7 illustrates optical characteristic values of the imaging lens systems according to the first to third examples, and Table 8 illustrates conditional expressional values of the imaging lens systems according to the first to third examples.

TABLE 7

| Reference | First example | Second example | Third example |
|---|---|---|---|
| TTL | 19.000 | 18.989 | 19.001 |
| BFL | 3.100 | 3.100 | 3.100 |
| F | 3.325 | 3.320 | 3.278 |
| f1 | −6.240 | −6.318 | −5.691 |
| f2 | −18.412 | −16.640 | −37.013 |
| f3 | 5.947 | 5.973 | 5.997 |
| f4 | 5.115 | 4.616 | 7.104 |
| f5 | −3.345 | −3.304 | −4.180 |
| f6 | 5.873 | 7.147 | 4.764 |
| f7 | −39.005 | −203.622 | −14.831 |

TABLE 8

| Conditional expression | First example | Second example | Third example |
|---|---|---|---|
| V1/Nd1 | 27.9865 | 27.9865 | 27.9865 |
| V2/Nd2 | 42.3006 | 42.3006 | 42.3006 |
| V3/Nd3 | 25.7761 | 25.7761 | 25.7761 |
| V4/Nd4 | 36.3879 | 36.3879 | 36.3879 |
| V5/Nd5 | 14.3502 | 14.3502 | 14.3502 |
| V6/Nd6 | 36.3879 | 36.3879 | 36.3879 |
| V7/Nd7 | 36.3879 | 36.3879 | 14.0261 |
| Vmin13/Ndmin13 | 30.6526 | 30.6526 | 30.6526 |
| Vmax47/Ndmax47 | 34.0977 | 34.0977 | 34.0956 |
| f/f3 | 0.5591 | 0.5559 | 0.5466 |
| f34*0.8 | 2.3249 | 2.2075 | 2.7262 |
| Nd3/Nd4 | 1.1741 | 1.1741 | 1.1741 |

As set forth above, according to the various examples, an imaging lens system capable of realizing constant optical characteristic even in high-temperature or low-temperature environments may be provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
a first lens having a convex object-side surface, a second lens having a convex image-side surface, a third lens, a fourth lens, a fifth lens, a sixth lens, and a seventh lens, sequentially disposed from an object side,
wherein the imaging lens system has a total number of seven lenses with refractive power,
wherein the third lens has a refractive index temperature coefficient of 2.2 to 3.5 [10-6/° C.],
wherein $0<f34*0.8<f$ and $20<V1/Nd1<30$, where f is a focal length of the imaging lens system, f34 is a composite focal length of the third lens and the fourth lens, V1 is an Abbe number of the first lens, and Nd1 is a refractive index of the first lens,
wherein a thickness of the third lens is greater than a thickness of fourth lens, and
wherein an absolute value of a radius of curvature of the object-side surface of the first lens is greater than an absolute value of a radius of curvature of an object-side surface of the third lens.

2. The imaging lens system of claim 1, wherein the first lens, the second lens, and the third lens are formed of a material different from a material of the fourth lens, the fifth lens, the sixth lens, and the seventh lens.

3. The imaging lens system of claim 1, wherein $$35<V2/Nd2<45,$$

where V2 is an Abbe number of the second lens, and Nd2 is a refractive index of the second lens.

4. The imaging lens system of claim 1, wherein $$20<V3/Nd3<30,$$

where V3 is an Abbe number of the third lens, and Nd3 is a refractive index of the third lens.

5. The imaging lens system of claim 1, wherein $$10<V5/Nd5<20,$$

where V5 is an Abbe number of the fifth lens, and Nd5 is a refractive index of the fifth lens.

6. The imaging lens system of claim 1, wherein $$30<V6/Nd6<40,$$

where V6 is an Abbe number of the sixth lens, and Nd6 is a refractive index of the sixth lens.

7. The imaging lens system of claim 1, wherein $$27<V\min 13/Nd\min 13<37,$$

where V min 13 is a minimum value among Abbe numbers of the first lens, the second lens, and the third lens, and Nd min 13 is a minimum value among refractive indices of the first lens, the second lens, and the third lens.

8. The imaging lens system of claim 1, wherein $$30<V\max 47/Nd\max 47<35,$$

where V max 47 is a maximum value among Abbe numbers of the fourth lens, the fifth lens, the sixth lens, and the seventh lens, and Nd max 47 is a maximum value among refractive indices of the fourth lens, the fifth lens, the sixth lens, and the seventh lens.

9. The imaging lens system of claim 1, wherein $$0.4<f/f3<0.9,$$

where f3 is a focal length of the third lens.

* * * * *